(12) United States Patent
Brown et al.

(10) Patent No.: US 7,092,938 B2
(45) Date of Patent: Aug. 15, 2006

(54) UNIVERSAL SEARCH MANAGEMENT OVER ONE OR MORE NETWORKS

(75) Inventors: Gregory T. Brown, Rockmart, GA (US); Thomas A. Cofino, Rye, NY (US); Yurdaer Nezihi Doganata, Chestnut Ridge, NY (US); Youssef Drissi, Ossining, NY (US); Tong-Haing Fin, Harrison, NY (US); Moon Ju Kim, Wappingers Falls, NY (US); Lev Kozakov, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/229,552

(22) Filed: Aug. 28, 2002

(65) Prior Publication Data

US 2004/0044669 A1 Mar. 4, 2004

(51) Int. Cl.
*G06F 7/00* (2006.01)
(52) U.S. Cl. .............................................. 707/4; 707/3
(58) Field of Classification Search ................ 707/2, 707/3, 4, 5; 704/3; 709/310
See application file for complete search history.

(56) References Cited

U.S. PATENT DOCUMENTS

| | | | | |
|---|---|---|---|---|
| 5,819,263 | A | 10/1998 | Bromley et al. ............... | 707/3 |
| 6,360,196 | B1 | 3/2002 | Poznanski et al. ............. | 704/8 |
| 6,718,333 | B1* | 4/2004 | Matsuda ...................... | 707/102 |
| 2002/0002452 | A1* | 1/2002 | Christy et al. ................. | 704/3 |
| 2002/0107992 | A1* | 8/2002 | Osbourne et al. ........... | 709/310 |
| 2002/0184206 | A1* | 12/2002 | Evans ........................... | 707/4 |

FOREIGN PATENT DOCUMENTS

WO WO 02/01400 A1 6/2000

OTHER PUBLICATIONS

U.S. Appl. No. 10/157,243, filed May 30, 2002 & titled "Method & Apparatus for Providing Multiple Views of Virtual Documents".
U.S. Appl. No. 10/159,373, filed Jun. 3, 2002 & titled "A System & Method for Generating & Retrieving Different Document Layouts from a Given Content".
U.S. Appl. No. 10/180,195, filed Jun. 27, 2002 & titled "Retrieving Matching Documents by Queries in any National Language".
U.S. Appl. No. 10/209,619, filed Jul. 31, 2002 titled "A Method of Query Routing Optimization".
U.S. Appl. No. 10/066,346, filed Feb. 1, 2002 titled "Method & System for Searching a Multi-Lingual Database".

* cited by examiner

*Primary Examiner*—Sam Rimell
*Assistant Examiner*—Jacob F. Betit
(74) *Attorney, Agent, or Firm*—Norman Gundel (57) ABSTRACT

A search engine system is provided in which inputted data in various configurations is first passed through transitional translation layers which convert the data in its multiple configurations to a common or kernel computer form and language. The data is operated on and stored in the kernel form and language. The operated on data is then outputted through transitional translation layers and provided in the desired format the same or different from the input form and language.

3 Claims, 7 Drawing Sheets

UNIVERSAL SEARCH MANAGEMENT OVER ONE OR MORE NETWORKS

RELATED APPLICATIONS

The following related applications are hereby incorporated by reference:

(1) U.S. patent application, Ser. No. 10/157,243, filed on May 30, 2002 and entitled "Method and Apparatus for Providing Multiple Views of Virtual Documents."

(2) U.S. patent application, Ser. No. 10/159,373, filed on Jun. 03, 2002 and entitled "A System and Method for Generating and Retrieving Different Document Layouts from a Given Content."

(3) U.S. patent application, Ser. No. 10/180,195, filed on Jun. 27, 2002 and entitled "Retrieving Matching Documents by Queries in Any National Language."

(4) U.S. Patent application, Ser. No. 10/202,564, filed on Jul. 23, 2002 and entitled "Method of Search Optimization Based on Generation of Context Focused Queries."

(5) U.S. patent application, Ser. No. 10/209,619 filed on Jul. 31, 2002 and entitled "A Method of Query Routing Optimization."

(6) U.S. patent application, Ser. No. 10/066,346 filed on Feb. 01, 2002 and entitled "Method and System for Searching a Multi-Lingual Database."

FIELD OF THE INVENTION

The present invention relates to database networks. More particularly, the present invention relates to managing keyword searches and search results on database networks.

BACKGROUND OF THE INVENTION

Internet text retrieval systems accept a statement of requested information in terms of a search query S made up of a plurality of keywords $T_1, T_2, \ldots T_i, \ldots T_n$ and return a list of documents that match the search query. The need to perform such searches on internet databases has resulted in development of search engines that provide a query interface to the information containing sources and return search results ranked sequentially on how well the listed documents match the search query. However, the various search engines process search interrogations in different ways and as a result the same query will result in different results from the different search engines. Further, with the expansion of the world wide web, databases and search engines available for search have multiplied to the extent that the amount of data available to users has increased dramatically. In addition, the information requested by the searcher can be printed, audio, and/or visual data. This data can be in both analog and digital form, and in a number of different formats, and in multiple machine and natural languages. The type of data and its form, format, and languages may not be what is required or even understood by the searcher, and the results can be incomplete, incomprehensible, imprecise, and varying.

Because of the above and other considerations, it is difficult to obtain complete, understandable and accurate results from searches for information from all relative sources. Moreover, the information processing resources and man hours necessary to perform such searching can be expensive. What is needed to overcome information overload in a distributed information system is an automated system and method of information retrieval which optimally selects sources or databases of all types that are most likely to provide the best response to a search and tailors the received responses to needs of the searcher.

Therefore it is an object of the present invention to provide an improved query routing system.

It is further an object of the present invention to provide a query routing system capable of accessing information in numerous forms, formats and languages and capable of providing the information to searchers in other types, formats and languages.

BRIEF DESCRIPTION OF THE INVENTION

In accordance with the present invention, a search engine system is provided in which inputted data in various configurations is first passed through transitional translation layers which convert the data in its multiple configurations to a common or kernel computer form and language. The data is operated on and stored in the kernel form and language. The operated on data is then outputted through transitional translation layers and provided in the desired format the same or different from the input form and language.

DETAILED DESCRIPTION OF THE INVENTION

Figure 1:
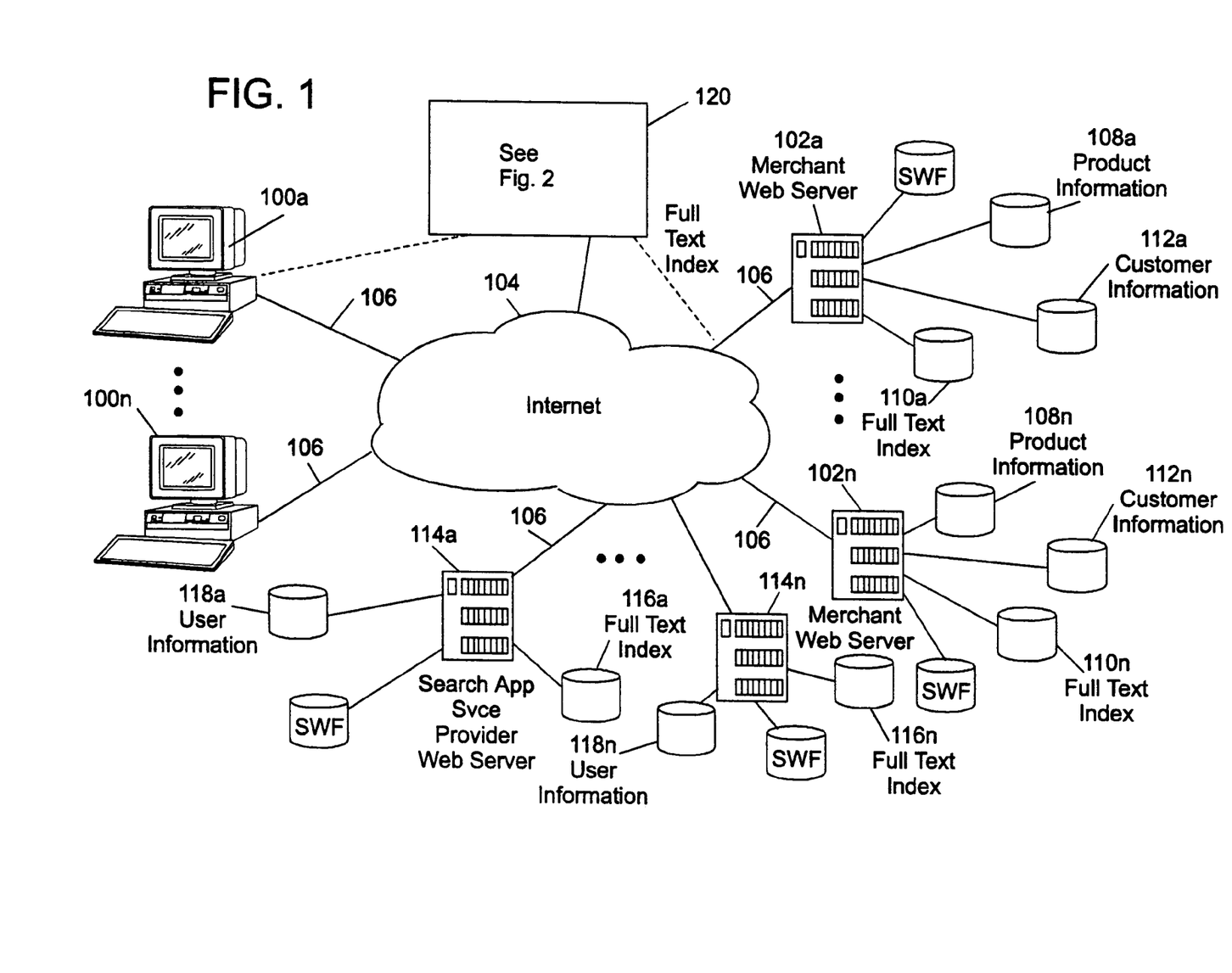
FIG. 1 is a schematic diagram for system organization of an on-line area network.

Referring now to FIG. 1, communication between a plurality of user computers 100a to 100n and a plurality of information servers 102a to 102n is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants which, for a fee provide products, services and information over the Internet. While the following discussion is directed at communication between shoppers and such merchants over the Internet, it is generally applicable to any information seeker and any information provider on a network. (For instance, the information provider can be a library such as a University library, a public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which providers maintain full text indexes 116 of the products of the individual merchants 102a to 102n obtained by interrogating the product information databases 108 of the individual merchants. Some of these search service providers, like Google, are general purpose search providers while others are topic specific search providers.

The merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, occupation, address, hobbies) regarding the shopper as provided by the shopper when subscribing to the service or obtained from other sources. Profile data can help in discerning the meaning of words used in a keyword query. For instance, a keyword in the query of a medical doctor could have an entirely different meaning to the use of the same keyword presented by a civil engineer. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain basic test ranking Tf (including the number of hits, their location, etc. which are used to order the list of documents) with documents with higher scores at the top. This list is then sent to a ranking module which will apply a ranking algorithm, such as the one described in the article entitled "The Anatomy of a Large-Scale Hypertextual Web Search Engine" by Sergey Brin and Lawrence Page of the Computer Science Department, Stanford University, Stanford, Calif. 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

FIG. 1 shows an information consolidator 120. An information consolidator obtains information from various ones of the merchant servers 102 and those of the search application service providers 114 and supplies it to a user. The information consolidator may be an independent source for data, or as shown by the dotted lines, associated with either a merchant 102a providing the data or be the user 100a obtaining the data. The information consolidator provides added value by modification of the data it receives from its sources. As pointed out, the ranking of data provided by the merchant or search application service provider varies from that provided by raw ranking element data either to be helpful to the user or to add biases of the data provider. The information consolidator may modify that data to remove the biases of the data provider and to add other information helpful to the user. As described herein the information consolidator is on a private network.

Figure 2:
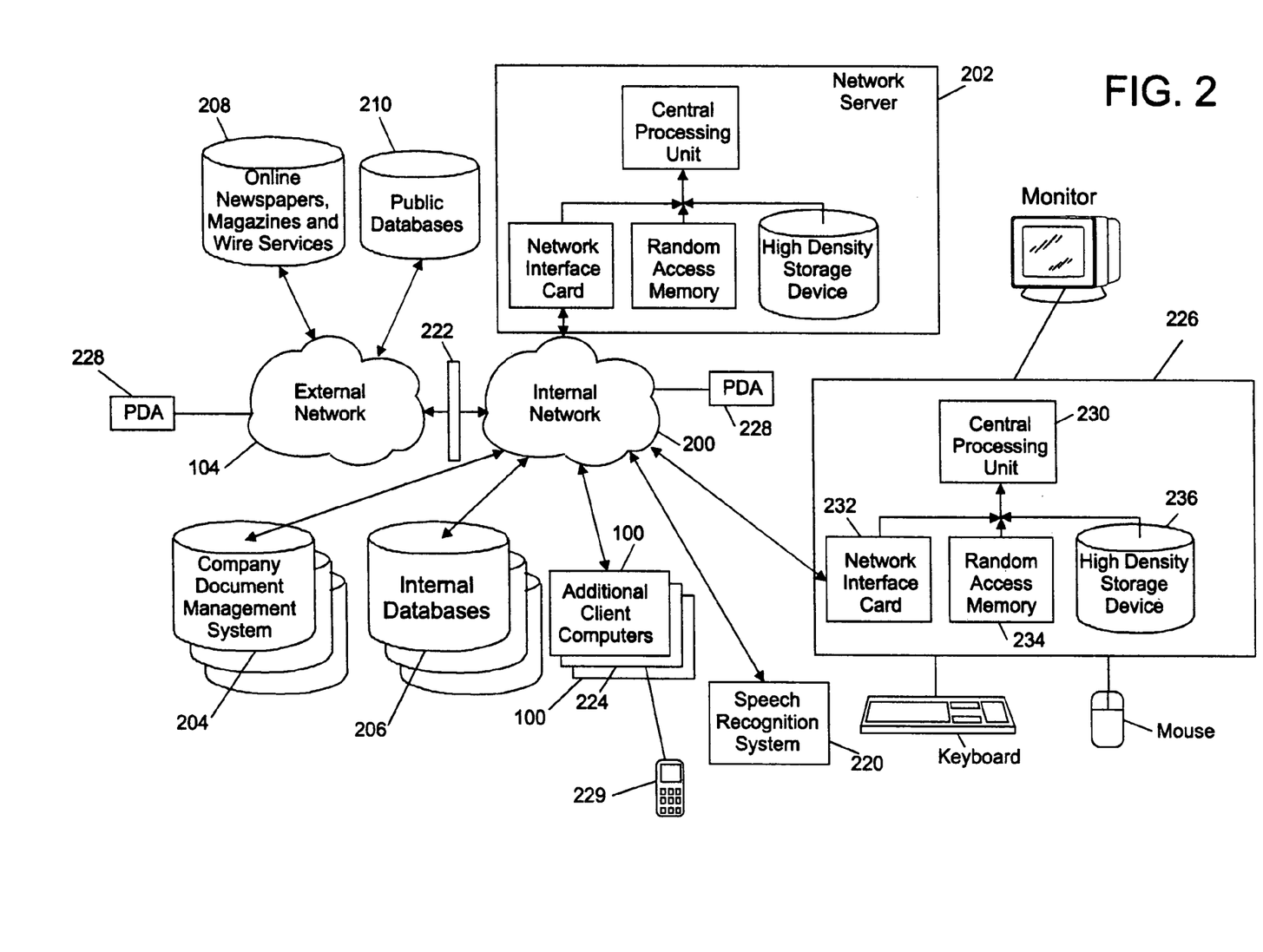
FIG. 2 is a schematic diagram of a private network incorporating the present invention and connected to the network shown in FIG. 1.

As shown in FIG. 2, the information consolidator 120 is connected in a private intranet network 200 with a server 202 and contains a number of computers 100, such as those described in FIG. 1, so that the computers 100 can obtain information stored in the internal sources of the private intranet. The intranet 200 is provided with public internet access capability which provides access to services on the public internet 104 and enables the information consolidator to provide services on the internet. A "firewall" 222 separates the public internet 104 from the private intranet 200 allowing only those with the proper ID and password to enter the intranet 200 from the public internet 104. Internal sources of the intranet 200 are company document management systems 204, and internal databases 206. Also, intranet 200 is provided with a speech recognition system 220 capable of responding to compressed digitized data of voice commands and voice dictation provided by the client computers 100 either from an individual computer 100 or a client's network of such computers.

In accordance with the present invention, the information consolidator 120 contains an integrated search management system 226 which receives queries and information from search engines both in the intranet and internet and accesses information sources other than those that are in the intranet and internet through the computers 100, PDAs 228. For example, voice messages transmitted to computer 224 and connected to text by a speech recognition system 220 can be stored in the integrated search management system 226. The integrated management system contains a central processing unit 230, a network interface 232 and sufficient random access memory 234 and high density storage 236 to perform its functions.

Figure 3:
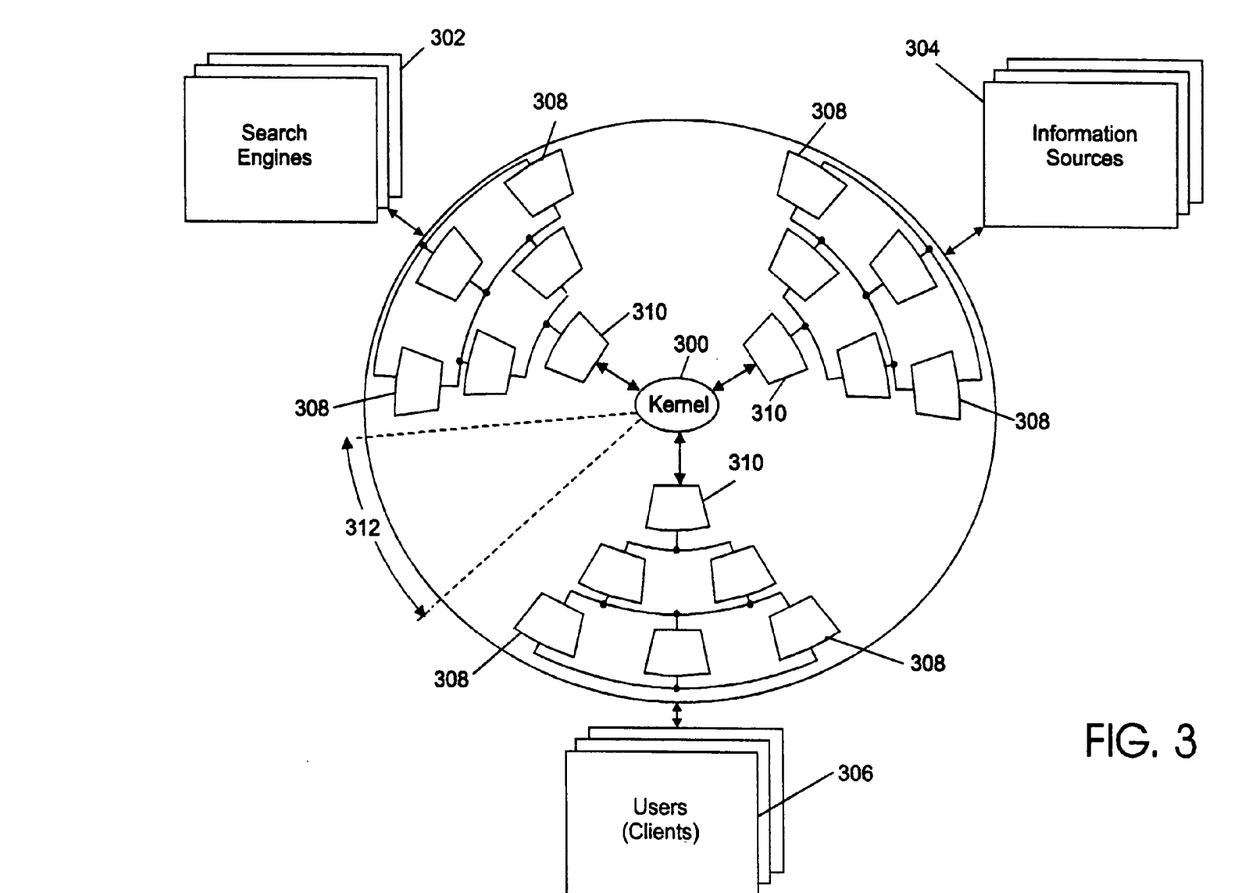
FIG. 3 is a schematic diagram showing the arrangement of information sources, search engines in connection with the translation layers and information kernel of the present invention.

As shown in FIG. 3, the integrated search management system 226 has a core or kernel 300 that operates only on data and code in extended markup language (XML) form with characters coded in the Universal Unicode Character set. Data from all possible sources are reduced to a common form before entering the integrated search management system. For instance, HTML pages, text files, and the mentioned voice messages, are converted to common form. Data in the various source forms of the search engines 302, the information sources 304 and user machines 306 are converted to the XML kernel form in a series of shells containing translators in which the various documents are converted from their source forms to the XML form in the interior translators. The translators 308 are arranged in layers so that they can be shared in the translations between the source languages and the kernel language. When a new source layer is to be added, an additional layer can be provided to translate between the new or modified source language and an existing source language. If an entirely new protocol is to be accommodated, an additional segment 312 of translators 308 and 310 can be added. This provides a search management system with evolving technology with modular use of object oriented program modulars for the translation units 308 and 310.

Figure 4:
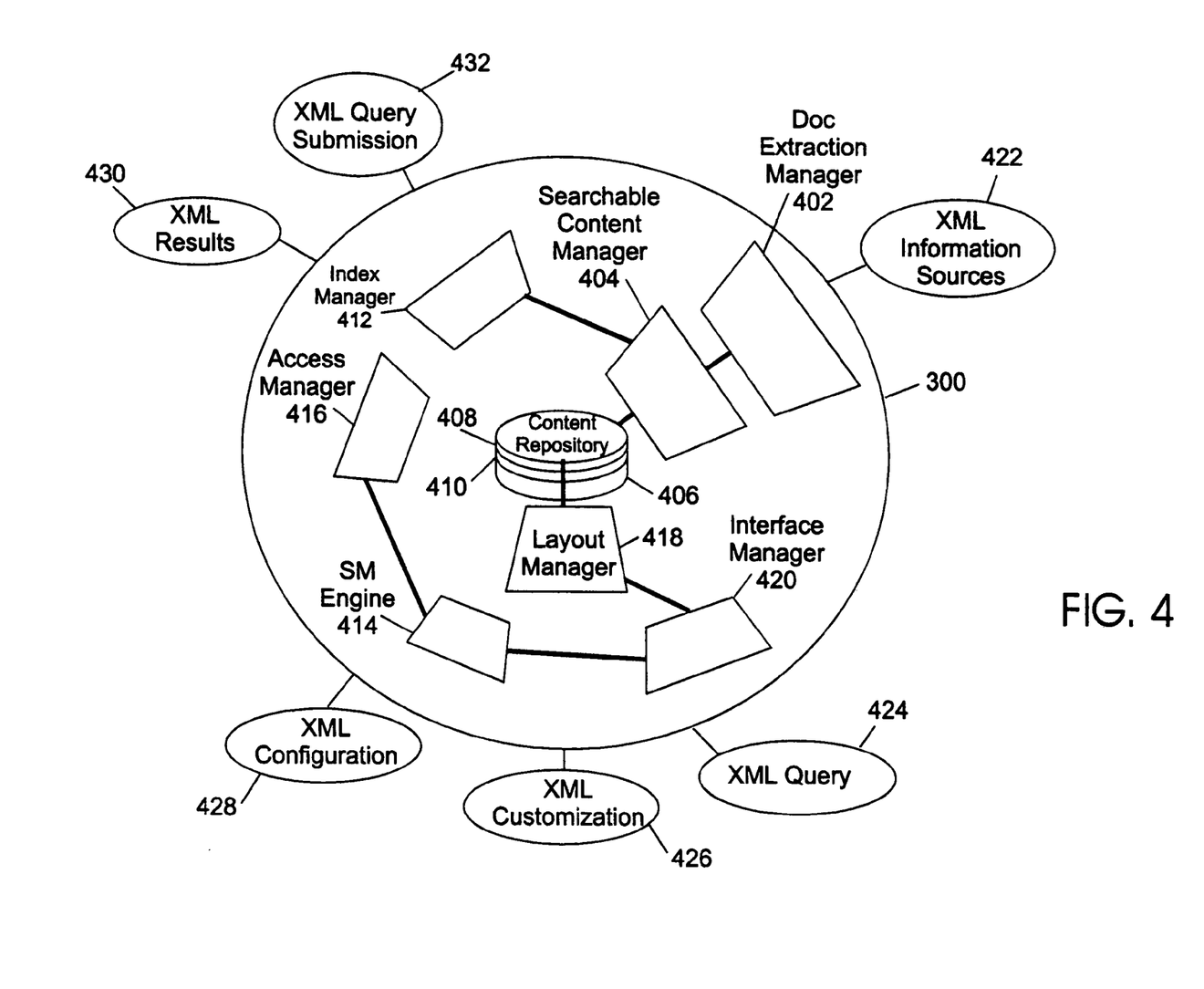
FIG. 4 is a schematic diagram showing details of the kernel of the present invention.

As shown in FIG. 4, the arrangement allows the kernel 300 to contain a minimum number of elements. These elements are:

The Document Extraction Manager 402 which is responsible for "crawling" the original information sources and extracting the data and document content using an adequate mechanism compatible with the information source and places the data in a format that can be processed by the Searchable Content Manager. U.S. patent application, Ser. No. 10/157,243 filed on May 30, 2002 contains a description of the Document Extraction Manager.

The Searchable Content Manager 404 which is responsible for processing the data extracted from the information sources and storing it in the Content Repository 406. The data is stored in a standard format which is preferably based on granular elements/components of the documents. These elements can later be combined to compose coherent documents. A description of process can be found in U.S. patent application, Ser. No. 10/159,373 filed on Jun. 30, 2002.

The Content Repository 406 which is a searchable library of document components where the elements of the searchable content are stored. The repository has a search index 408 to provide a mechanism to request a specific document, with a given set of attributes such as document view, document type, meta data, etc. Documents are stored in all supported natural languages NL in the content repository and the index contains an inverted index 410 of U.S. patent application, Ser. No. 10/180,195, filed on Jun. 27, 2002 and U.S. patent application, Ser. No. 10/066,346 filed on Feb. 01, 2002, to allow selection of the documents in appropriate languages.

The Index Manager 412 which is responsible for building and updating the search index 408 by using the appropriate interfaces provided by the search engines, and based on the content stored in the Content Repository. The index manager can handle multiple search indices.

The Search Management Engine 414 which is primarily responsible for collecting the input parameters for the search query from the Interface Manager component and building a final query object using the configuration information (e.g., search engine parameters), personalization information (e.g., preferred document type), and taxonomy information (e.g., search categories). U.S. Patent application, Ser. No. 10/247,924, filed on Sep. 20, 2002, contains a description of the Search Management Engine.

The Access Manager 416 which is the direct interface to the search engine(s). It is responsible for submitting the search queries to the search engine(s) in the adequate format, and collecting the search results to be processed and returned to the user by other components. This can be achieved by using a generic adapter interface facing the internal components, and pluggable adapters facing the different search engines, U.S. patent application, Ser. No. 10/209,619, filed on Jul. 31, 2002, and U.S. patent application, Ser. No. 10/759,373 filed on Jun. 03, 2002, contains a description of the access manager.

The Layout Manager 418 which is responsible for building and customizing the layout of document content and search results. The content is retrieved from the Content Repository module 406. The Layout Manager is described in U.S. patent application, Ser. No. 10/159,373, filed on Jun. 03, 2002 contains a description of the Layout Manager.

The Interface Manager 420 which is responsible for handling the GUI for the user and interfacing with the back-end modules. The inputs and outputs 422, 424, 426, 428, 430 and 432 to the kernel are the outputs and inputs of the translation stages 310 interfacing with the kernel 300, respectively.

Figure 5:
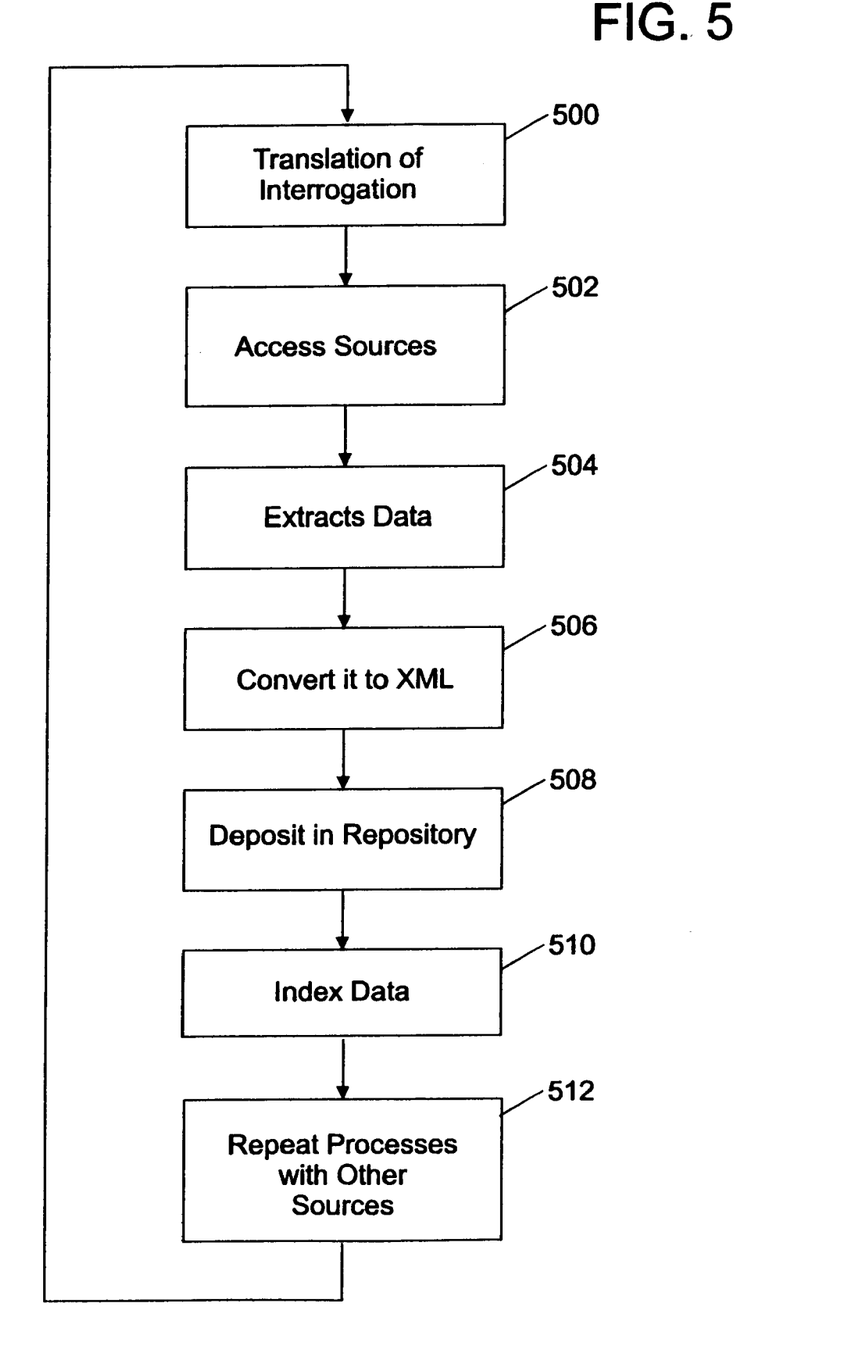
FIG. 5 is a schematic flow diagram showing back-end data collection in accordance with the present invention.

Referring now to FIG. 5, documents and other data are extracted from the sources both on the intra and internets by a back-end process of continuously extracting, storing and indexing the data. The document extraction manager 402 goes out to the data sources through the translators 308 and 310 to each of the sources to provide a compatible request to the information source (steps 500 and 502). It extracts the data from the source, converts it to XML form in translators 308 and 310 and places the data in the content repository 406 (steps 504, 506 and 510). The index manager 412 generates index data for the extracted document and places it in the content repository along with the data (step 512). All supported national languages NL of the document are extracted and stored in the repository and are accessible using the inverted index 410.

Figure 6:
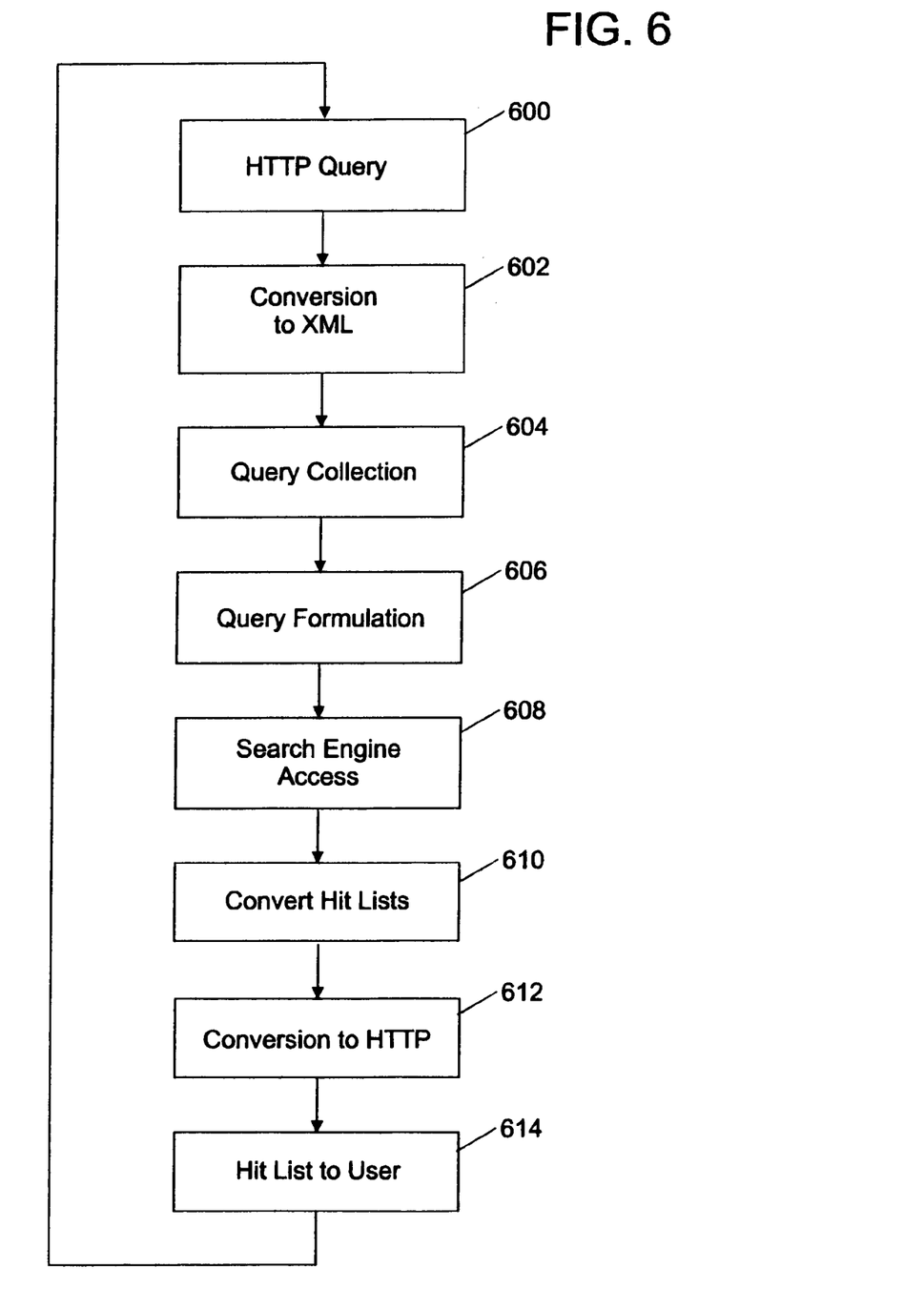
FIG. 6 is a schematic flow diagram of the handling of a keyword query in accordance with the present invention.

Referring now to FIG. 6, upon the receipt of a query in the HTTP language (step 600), the translators 308 and 310 translate the query to the kernel XML form (step 602). The interface manager formulates the query for accessing the content repository 406 (step 604) and provides the query to the Search Management engine 414 (steps 606 and 608) which obtains customization and configuration data and adds it to that of the query. The customization data personalizes the query to that of the user while the configuration data identifies the source of the particular internet or intranet server providing the data. The access manager 416 generates a hit list for the information (step 610) and provides it to the interface manager 420 which changes it to the GUI of the user transmits it to the translators 308 and 310 to convert it to the language of the users interface (step 612).

Figure 7:
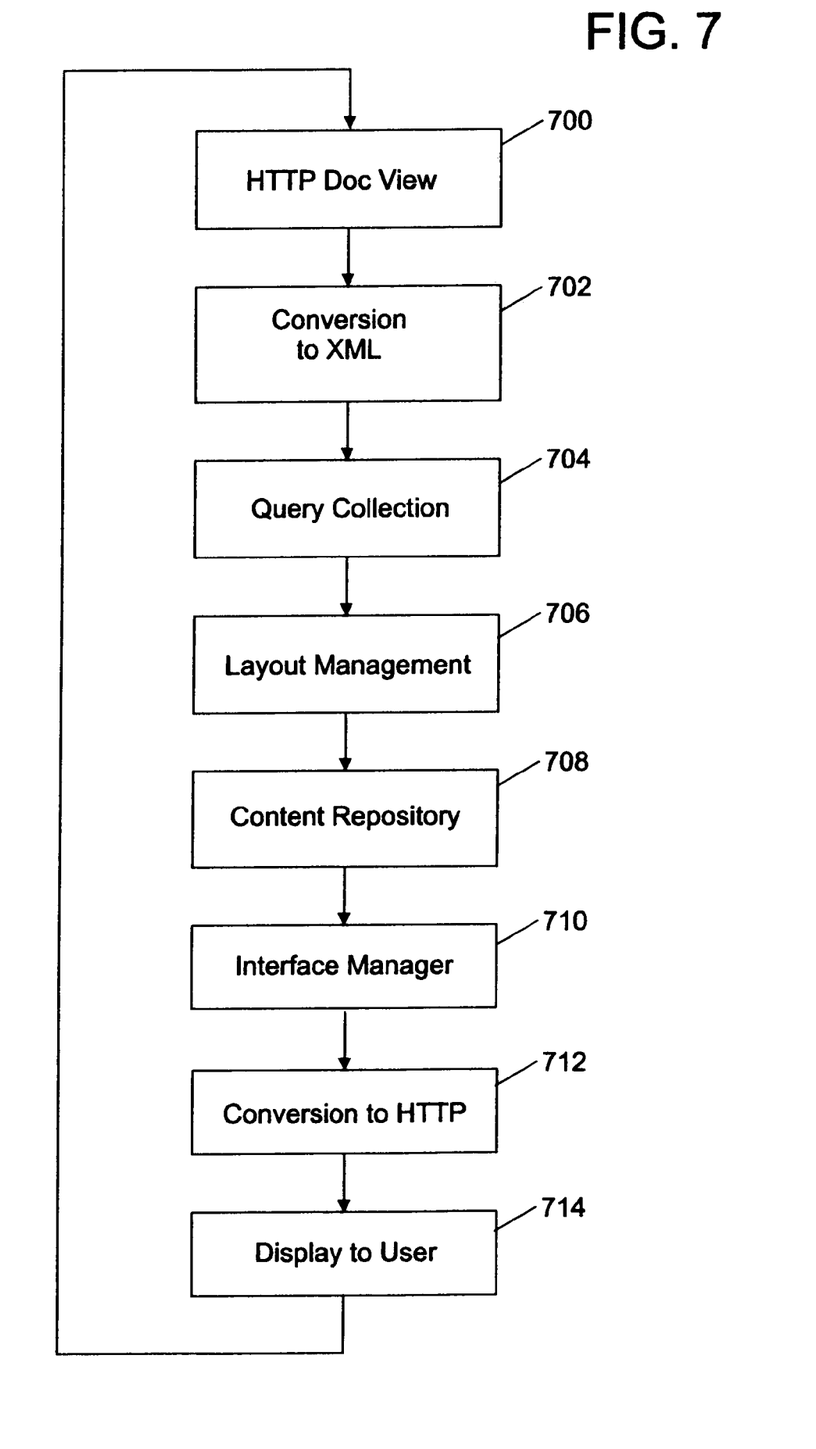
FIG. 7 is a schematic diagram of the handling of document request query in accordance with the present invention.

Referring now to FIG. 7, when a user views the hit list and requests the data with an HTTP document view query (step 700) the data is converted to an XML query (step 702) and fed to the interface manager 302 for query collection (step 704). The information from the interface manager is fed to the layout manager 418 which generates documents from the contents of the content repository 314 (steps 706 and 708) and transmits the document to the user through the interface manager 420 and translators 308 and 310 to convert the XML documents to the HTTP form (steps 710 and 712) and provides them to the user display (step 714).

Above we have described one embodiment of the invention and modifications of this embodiment may be apparent to those skilled in the art. For instance as pointed out, different languages are easily accommodated by addition of another layer to the translators while entirely different languages can be added by adding an additional segment to access the kernel. Further while XML has been used as the kernel of the languages, other languages, such as GML, html, can be used in place of XML. In addition, the translators are described as translating between XML and HTTP, html, and other connectors can be used. For this reason it should be understood that the present invention is not limited to the described embodiment but includes all changes that fall within the spirit and scope of the appended claims.

The invention claimed is:

1. A search engine management system for an intranet database having one or more central processing units, one or more memories, and one or more network connections including connection to the internet, the system comprising:
   a kernel content repository storing data including documents in multiple natural languages using a kernel format with a single computer language for all stored data;
   a format translation layer arranged in segments and stages that receives one or more key word data inputs from one or more of the network connections, the inputs being in a plurality of input formats and computer languages, the format translational layer converting the input formats and languages to the kernel format with the single computer language using input adaptors, the translational layer further having one or more output adaptors; and
   a kernel layer using the kernel format to operate on the keyword data from the translational layer with one or more kernel elements to produce results in a kernel language from data stored in the content repository that are sent to one or more of the network outputs through the translational layer where the output adaptors convert the kernel language results to at least one or more output formats so that adaption of the search engine management system to new formats can be accomplished in the translational layer by addition of a new stage or segment without modifying the kernel layer wherein the kernel elements of the kernel layer comprise:
   a document extraction manager that crawls original information sources and extracts data including document content and places the data in a format that can be processed by a searchable content manager;
   the searchable content manager processes data extracted from information sources and stores it in the content repository;
   the content repository is a searchable library of document components, the repository has an inverted search index to provide a mechanism to request a specific document in any one of multiple languages;
   an index manager builds that updates the search index based on the content stored in the content repository;
   a search management engine that collects input parameters for a search query from an interface manager and builds a final query object using configuration information, personalization information, and taxonomy information;
   an access manager which submits search queries in a proper format, and collects search results to be processed and returned to a user of the database;
   a layout manager that builds and customizes the layout of a document retrieved from the content repository; and
   the interface manager that handles GUI for a user of the database.

2. A computer program product on a computer usable medium for a search engine management system for an intranet database having one or more central processing units, one or more memories, and one or more network connections including connection to the internet, the computer program product comprising:
   software for a kernel content repository for storing data including documents in multiple natural languages using a kernel format with a single computer language for all stored data;
   software for a format translational layer, arranged in segments and stages, that receives one or more key word data inputs through one or more of the network connections, the input being in a plurality of input formats and languages, the formal translational layer converting the input formats to the kernel format using input adaptors, the format translation layer further having one or more output adaptors; and
   software for a kernel layer using the kernel format to operate on the keyword data from the translational layer with one or more kernel elements to produce search results in the kernel format that are sent to one or more network outputs through the translational layer where the output adaptors convert the results in the kernel format to at least one of the output formats and languages so that adaption of the system to new formats can be accomplished in the translational layer by addition or modification of stages or segments without modifying the kernel layer wherein, software for elements of the kernel layer comprise:
   a document extraction manager component that crawls original information sources and extracts data including document content and places the data in a format that can be processed by a searchable content manager component;
   the searchable content manager component processes data extracted from information sources and stores it in the kernel content repository component;
   the kernel content repository component is a searchable library of document components, the kernel content repository has an inverted search index to provide a mechanism to request a specific document in multiple languages;
   an index manager component that builds and updates the search index based on content stored in the content repository;
   a search management engine component that collects the input parameters for a search query from an interface manager component and builds a final query object using configuration information, personalization information, and taxonomy information;
   an access manager component which submits search queries in a proper format, and collects the search results to be processed and returned to the user;
   a layout manager component that builds and customizes the layout of a document retrieved from the kernel content repository; and
   an interface manager component that handles GUI for a user of the database.

3. A method of search engine management for an intranet database having one or more central processing units, one or more memories, and one or more network connections including connection to the internet, the method comprising:

providing a kernel content repository storing data including documents in multiple natural languages using a single kernel format with a single computer language for all stored data;

having a format translation layer, arranged in segments and stages, that receives one or more key word data inputs through one or more of the network connections, the inputs being in a plurality of input formats and languages, the format translational layer converting the input formats and languages to the kernel format with a single language using input adaptors in the translation layer, the translation layer further having one or more output adaptors;

adapting to a new input language or format by addition or modification of a segment or stage; and having a kernel layer using the kernel format to operate on the keyword data provided by the translational layer with one or more of the kernel elements through the translational layer where the output adaptors convert the kernel results to at least one of the output formats and natural language so that adaption of the system to new formats can be accomplished in the translational layer by addition or modification of stages or segments of the translation layer without modifying the kernel layer, wherein the kernal layer comprises;

a document extraction manager that crawls original information sources and extracts data including document content and places the data in a format that can be processed by a searchable content manager;

the searchable content manager processes data extracted from information sources and stores it in the kernel content repository;

the kernel content repository is a searchable library of document components, the repository has an inverted search index to provide a mechanism to request a specific document in multiple languages with a given set of attributes such as document view, document type and meta data;

an index manager that builds and updates the search index based on content stored in the kernel content repository;

a search management engine that collects input parameters for a search query from an interface manager and builds a final query object using the configuration information, personalization information, and taxonomy information;

an access manager which submits search queries in a proper format, and collects the search results to be processed and returned to the user;

a layout manager that builds and customizes the layout of a document retrieved from the content repository; and the interface manager that handles GUI for a user of the database.

* * * * *